US007003194B2

(12) United States Patent
Jenkins

(10) Patent No.: US 7,003,194 B2
(45) Date of Patent: Feb. 21, 2006

(54) OPTICAL MULTIPLEXER AND DEMULTIPLEXER

(75) Inventor: Richard Michael Jenkins, Malvern (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/491,322

(22) PCT Filed: Oct. 8, 2002

(86) PCT No.: PCT/GB02/04560

§ 371 (c)(1), (2), (4) Date: Mar. 31, 2004

(87) PCT Pub. No.: WO03/036353

PCT Pub. Date: May 1, 2003

(65) Prior Publication Data

US 2004/0247235 A1 Dec. 9, 2004

(30) Foreign Application Priority Data

Oct. 20, 2001 (GB) ............................................ 0125260

(51) Int. Cl.
*G02B 6/28* (2006.01)
*G02B 6/00* (2006.01)

(52) U.S. Cl. .............................. 385/24; 398/43; 398/48

(58) Field of Classification Search ................... 385/16, 385/24, 31, 39, 50, 124, 147; 398/40–45
See application file for complete search history.

(56) References Cited

U.S. PATENT DOCUMENTS

| | | | | |
|---|---|---|---|---|
| 5,410,625 | A | | 4/1995 | Jenkins et al. |
| 5,563,968 | A | | 10/1996 | Pennings et al. |
| 5,640,474 | A | | 6/1997 | Tayag |
| 5,822,481 | A | | 10/1998 | Mestric |
| 5,862,288 | A | * | 1/1999 | Tayag et al. ................ 385/129 |
| 6,233,378 | B1 | * | 5/2001 | Sun ............................ 385/22 |
| 2002/0025102 | A1 | | 2/2002 | Okayama |

OTHER PUBLICATIONS

Earnshaw, et al. "An Optical Multiwaveguide Interference Filter", *Optics Communications* pp. 339–342 (1995).

Search Report from the GB Patent Office for Application No. GB 0125290.0.

* cited by examiner

*Primary Examiner*—Akm Enayet Ullah
(74) *Attorney, Agent, or Firm*—McDonnell Boehnen Hulbert & Berghoff LLP

(57) ABSTRACT

An optical multiplexer and demultiplexer (mux-demux) (100) comprises a multimode waveguide (126) which communicates with first (122) and second (124) coupling waveguides. Multiplexed optical radiation comprising individual wavelength channels of appropriate wavelength introduced into the input waveguide is demultiplexed by means of modal dispersion and in-ter-modal interference with the multimode waveguide. The mux-demux consists of merely of waveguides and is therefore simple to fabricate and integrate with other components in integrated optical systems, and is capable of resolving channels having a small (~1 nm) wavelength spacing. The mux-demux may be used without modification as a demultiplexer and remains of simple construction when scaled up to operate with many channels.

7 Claims, 4 Drawing Sheets

OPTICAL MULTIPLEXER AND DEMULTIPLEXER

The present invention relates to optical multiplexers and demultiplexers (mux-demuxes).

Optical multiplexing and demultiplexing, that is, combination and separation of individual optical channels of various wavelengths into and from a single (multiplexed) signal comprising those channels, is an important function in optical communications systems. Multiplexing and demultiplexing are typically performed within optical communications systems by array waveguide gratings (AWGs). An AWG is a device comprising a series of waveguides of different length each of which communicates at one end with an input waveguide. For a given spectral component within radiation input to the AWG, a phase variation across the ends of the waveguides remote from the input waveguide is produced, the variation being specific to that spectral component. This allows different spectral components in the input radiation to be passed to different output waveguides of the AWG, thus achieving a demultiplexing function.

AWGs are described, for example, In the book"Optical Networks - A Practical Perspective" by R. Ramaswami and K. N. Sivarajan (Morgan Kaufmann Publishers 1998, ISBN1-55860-445-6). They are complicated devices requiring substantial processing effort In their fabrication, and are therefore time-consuming and expensive to produce. Furthermore their complexity makes it difficult to integrate them with other devices (e.g. lasers, modulators etc) within integrated optical systems.

Mux-demuxes based on the principle of self-imaging by modal dispersion and inter-modal interference within a multimode waveguide are of simpler construction than AWGs and hence provide for simpler fabrication and integration. Two such devices are described in U.S. Pat. No. 5,862,288. A disadvantage with such devices is that the wavelengths at which they operate are constrained. For example, U.S. Pat. No. 5,862,288 describes two mux-demuxes each of which operates to resolve (or combine) two optical channels having wavelengths $\lambda_1,\lambda_2$. One device requires $\lambda_2=2\lambda_1$ in order to operate and the other requires $\lambda_2=2M\lambda_1$ where M is an integer. Such constraints on operating wavelengths mean that mux-demuxes of this type are not suitable for use In practical WDM communication systems, in which optical channels have a wavelength spacing on the order of 1 nm, even though they are desirable from the point of view of simple fabrication and integration. Furthermore such devices become more complex in construction when designed to operate with many optical channels.

It is an object of the present invention to provide a mux-demux based on the principle of self-imaging by modal dispersion and inter-modal interference within a multimode waveguide and which is capable of resolving optical channels having a wavelength spacing of a size typically found in practical optical communication systems.

According to a first aspect of the present invention, this object is achieved by an optical multiplexer and demultiplexer comprising (i) a multimode waveguide;

(ii) a first coupling waveguide which communicates with the multimode waveguide at a first longitudinal position therealong; and (iii) two second coupling waveguides which communicate with the multimode waveguide at respective second longitudinal positions therealong;

wherein the second longitudinal positions and the relative orientations of the waveguides' central longitudinal axes are such that an input optical field distribution, being a lowest order transverse mode of the coupling waveguides and comprising radiation of first and second wavelengths, when introduced into the multimode waveguide via the first coupling waveguide is substantially reproduced at the second longitudinal positions as first and second output optical field distributions of first and second wavelengths respectively, which output distributions are coupled into respective second coupling waveguides, by virtue of modal dispersion and inter-modal interference within the multimode waveguide, characterised in that the coupling waveguides each communicate with a lateral side of the multimode waveguide.

The second longitudinal positions may be located on a lateral side of the multimode waveguide opposite to that on which the first longitudinal position is located, in which case each second longitudinal position may be separated from the first longitudinal position by a distance 4 $mw^2/\lambda$ where m is a positive integer, w is the coupling waveguides' width and $\lambda$ is a wavelength to be multiplexed or demultiplexed.

Alternatively the first and second longitudinal positions may be located on a common lateral side of the multimode waveguide, in which case each second longitudinal position may be separated from the first longitudinal position by a distance 8 $mw^2/\lambda$ where m is a positive integer, w is the coupling waveguides' width and $\lambda$ is a wavelength to be multiplexed or demultiplexed.

Alternatively the second longitudinal positions may be located on both lateral sides of the multimode waveguide.

According to a second aspect of the present invention, there is provided a laser oscillator characterised in that it comprises a multiplexer and demultiplexer according to the first aspect of the invention.

Embodiments of the invention are described below, by way of example only, with reference to the accompanying drawings in which.

Figure 1:
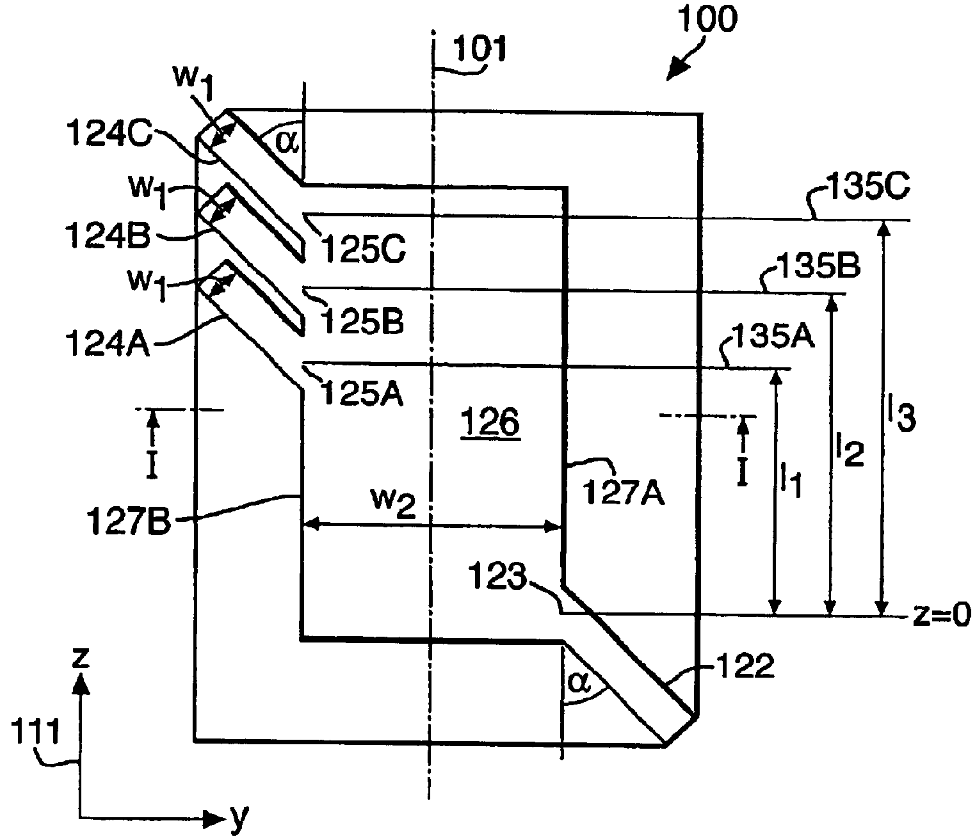
FIG. 1 shows a plan view of an optical multiplexer and demultiplexer of the invention.

Referring now to FIG. 1, there is shown a plan view of a semiconductor multiplexer and demultiplexer (hereinafter "mux-demux") of the invention, indicated generally by 100 which has a central longitudinal axis 101, and is referred to a coordinate system 111, which operates to demultiplex input radiation comprising three spectral components having wavelengths within the mux-demux 100 of $\lambda_1$=1003 nm, $\lambda_2$=1000 nm and $\lambda_3$=997 nm. The mux-demux 100 has an input waveguide 122 and output waveguides 124A, 124B, 124C which communicate with a multimode waveguide 126 of the mux-demux 100, meeting the multimode waveguide 126 on opposite lateral sides 127A, 127B thereof. The input and output waveguides 122, 124 have central axes inclined to the axis 101 at an angle $\alpha$=42.9°. The input waveguide 122 communicates with the multimode waveguide 126 at a point 123 and the output waveguides 124A, 124B, 124C communicate with the multimode waveguide 126 at points 125A, 125B, 125C. The multimode waveguide 126 has a central longitudinal axis 101.

The input 122 and output waveguides 124A, 124B, 124C are each of width $w_1$=2 $\mu$m. The multimode waveguide 126 has a width $w_2$=20 μm. The output waveguides 124A, 124B, 124C have respective centres 125A, 125B, 125C at the multimode waveguide 126 which are separated in the z-direction from the centre 123 of the input waveguide 122 at the multimode waveguide 126 by distances of $L_1=4w_2^2/\lambda_1$=1595.2 μm, $L_2=4W_2^2/\lambda_2$=1600.0 μm and $L_3=4w_2^2/\lambda_3$=1604.8 μm respectively, i.e. centres of adjacent output waveguides are separated in the z-direction by a distance of 4.8 μm.

Figure 1A:
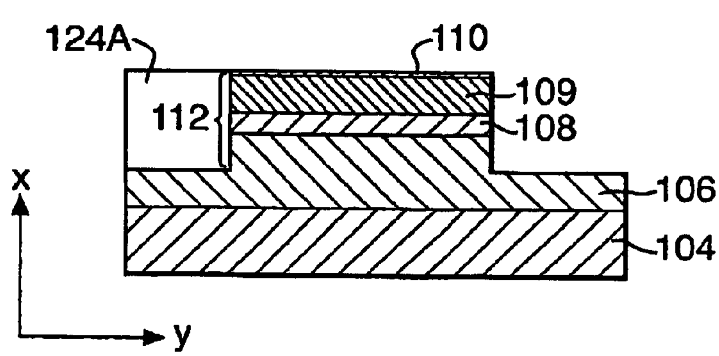

Referring to FIG. 1A, there is shown a vertical section through the mux-demux 100 along an xy plane |-| indicated in FIG. 1. In the x-direction the mux-demux 100 is a single-mode slab waveguide having a GaAs core layer 108 1 μm thick and $Al_{0.1}Ga_{0.9}As$ cladding layers 109, 106 having thicknesses of 2 μm and 4 μm respectively. The waveguides 122, 124, 126 are formed by etching through the core layer 108 and into the cladding layer 106 to a depth of 2 μm to produce ridge structures such as 112.

The mux-demux 100 operates as follows. Multiplexed input radiation comprising optical channels having wavelengths of $\lambda_1$=1003 nm, $\lambda_2$=1000 nm and $\lambda_3$=997 nm within the mux-demux 100 is introduced into the input waveguide 122 of the mux-demux 300 and is guided therein as a single-mode optical field. The input radiation enters the multimode waveguide 126 at an xy plane 133. The spectral component of the input radiation having wavelength $\lambda_2$=1000 nm excites transverse modes of the form $EH_{1,j}$ at that wavelength within the multimode waveguide 126 where j is an integer which may be either odd or even, I.e. both symmetric and antisymmetric transverse modes of the multimode waveguide 126 are excited. As a result of modal dispersion and inter-modal interference within the multimode waveguide 126, the input optical distribution in the y-direction of the spectral component $\lambda_2$=1000 nm evolves in the z-direction as shown in FIGS. 2 and 3.

Figure 2:
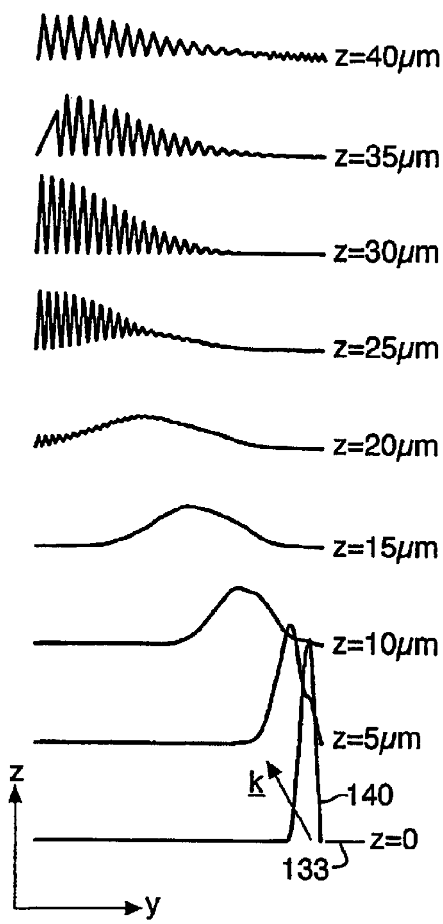
FIGS. 2 and 3 illustrate the spatial distribution of an optical field as a function of distance within portions of the FIG. 1 multiplexer and demultiplexer.

Referring to FIG. 2, the intensity distribution in the y-direction of the spectral component $\lambda_2$=1000nm within the multimode waveguide 126 is shown at 5 μm intervals in the z-direction, from z=0 to z=40 μm measured from the xy plane 133. The intensity distribution in the y-direction at the xy plane 133 (z=0) is indicated in FIG. 2 by 140. The wavevector of light within the multimode waveguide is indicated in FIG. 2 by k, which is directed along the input waveguide axis 122A and is inclined at 41.9° to the axis 101.

Figure 3:
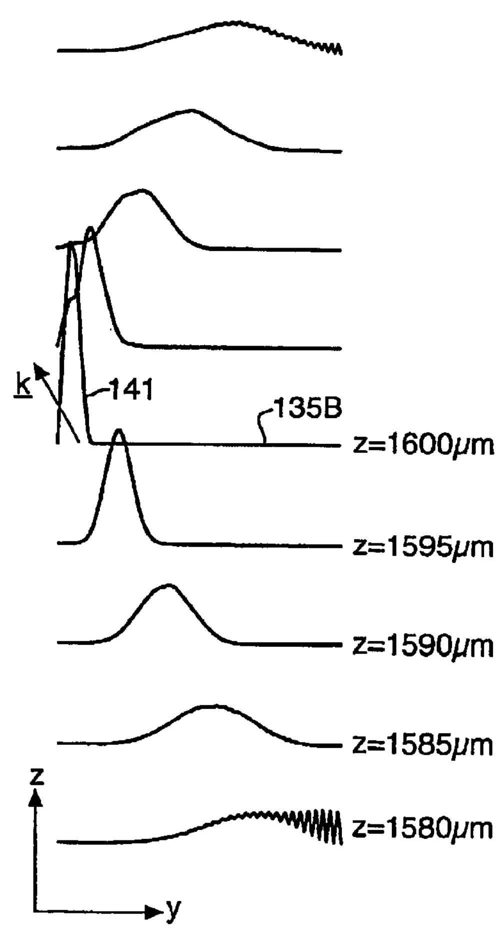

Referring to FIG. 3, the intensity distribution in the y-direction of the spectral component $\lambda_2$=1000 nm is shown at 5 μm intervals in the z-direction from z=1580 μm to z=1600 μm. At a distance z=1600 μm a mirror image 141 of the distribution 140 about the central axis 101 of the multimode waveguide 326 is produced as a result of modal dispersion and inter-modal interference within the waveguide 326. Light at the xy plane 135B has a wavevector k directed along the waveguide 324B and hence the spectral component $\lambda_2$=1000 nm is efficiently coupled into the output waveguide 324B.

Similarly, spectral component $\lambda_1$=1003 nm is coupled efficiently into output waveguide 324A because a mirror image of the input field distribution for that spectral component is generated about the axis 101 at a distance $L_1$ from the xy plane 133. Spectral component $\lambda_3$=997 nm is efficiently coupled into output waveguide 324C because a mirror image of the input field distribution for that spectral component is generated about the axis 101 at a distance $L_3$ from the xy plane 133. The mux-demux 100 thus efficiently demultiplexes the spectral components $\lambda_1$, $\lambda_2$, $\lambda_3$ which are combined in the input radiation which is introduced into the input waveguide 122.

The angle α may take values other than 42.90°, however it must be sufficiently small to allow total internal reflection of light within the multimode waveguide 128. In the present case, the angle α must be less than 73.3°. The angle α must also be sufficiently large to avoid phase perturbation effects of modes within the multimode waveguide 126.

Figure 4:
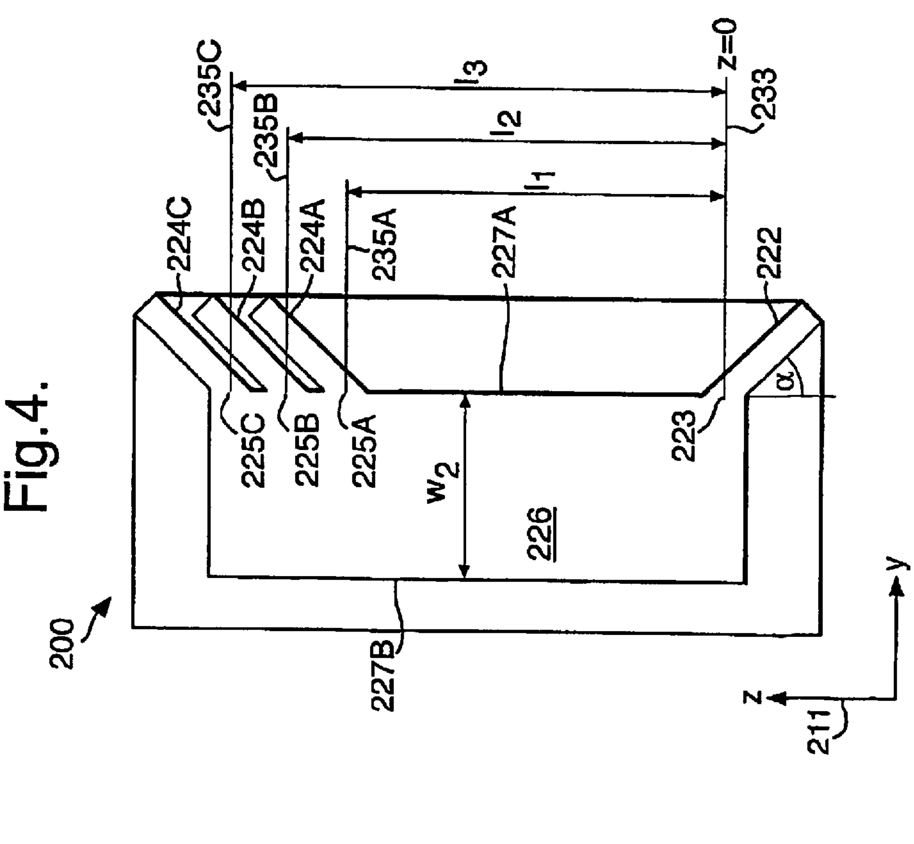
FIG. 4 is a plan view of another optical multiplexer and demultiplexer of the invention.

Referring now to FIG. 4 there is shown another mux-demux of the invention, indicated generally by 200 and referred to a coordinate system 211. The mux-demux 200 also operates to demultiplex input radiation comprising three spectral components having wavelengths within the mux-demux 200 of $\lambda_1$=1003 nm, $\lambda_2$=1000 nm and $\lambda_3$=997 nm. The mux-demux 200 has an input waveguide 222 and output waveguides 224A, 224B, 224C which communicate with a multimode waveguide 226 having lateral sides 227A, 2278, meeting the multimode waveguide 226 on a lateral side 227A thereof at an angle α=42.9°. The structure of the mux-demux 200 in the x-direction is like to that of the mux-demux 100 of FIG. 1. The input 222 and output waveguides 224A, 224B, 224C are each of width $w_1$=2 μm. The multimode waveguide 226 has a width $w_2$=20 μm. The output waveguides 224A, 224B, 224C have respective centres 225A, 225B, 225B at the multimode waveguide 226 which are separated in the z-direction from the centre 223 of the input waveguide 222 at the multimode waveguide 226 by distances of $I_1=8w_2^2/\lambda_1$=3190.4 μm, $I_2=8w_2^2/\lambda_2$=3200.0 μm and $I_3=8w_2^2/\lambda_3$=3209.6 μm respectively, i.e. centres of adjacent output waveguides are separated in the z-direction by a distance of 9.6 μm.

The mux-demux 200 operates in a like manner to the mux-demux 100. Multiplexed input radiation comprising optical channels having wavelengths $\lambda_1$=1003 nm, $\lambda_2$=1000 nm and $\lambda_3$=997 nm within the mux-demux 200 is introduced into the input waveguide 222 of the mux-demux 200 and is guided therein as a single-mode optical field. The input radiation enters the multimode waveguide 226 at an xy plane 233. The spectral component $\lambda_2$=1000 nm of the input radiation excites transverse modes of the form $EH_{1,j}$ at that wavelength within the multimode waveguide 226 where j is an integer which may be either odd or even, i.e. both symmetric and antisymmteric transverse modes of the waveguide 226 are excited. As a result of modal dispersion and inter-modal interference within the multimode waveguide 226, the input optical distribution in the y-direction of the spectral component $\lambda_2$=1000 nm evolves in the z-direction as shown in FIGS. 5 and 6.

Figure 5:
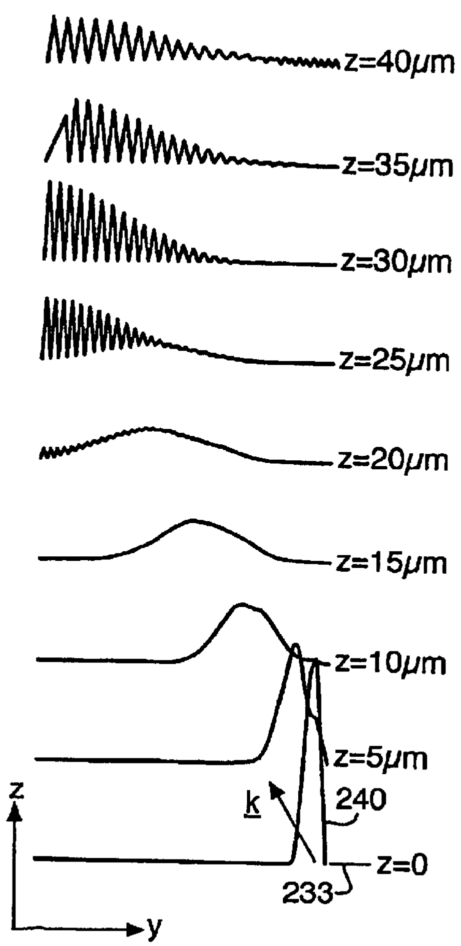
FIGS. 5 to 6 illustrate the spatial distribution of an optical field as a function of distance within portions of the FIGS. 4 multiplexer and demultiplexer.
Figure 6:
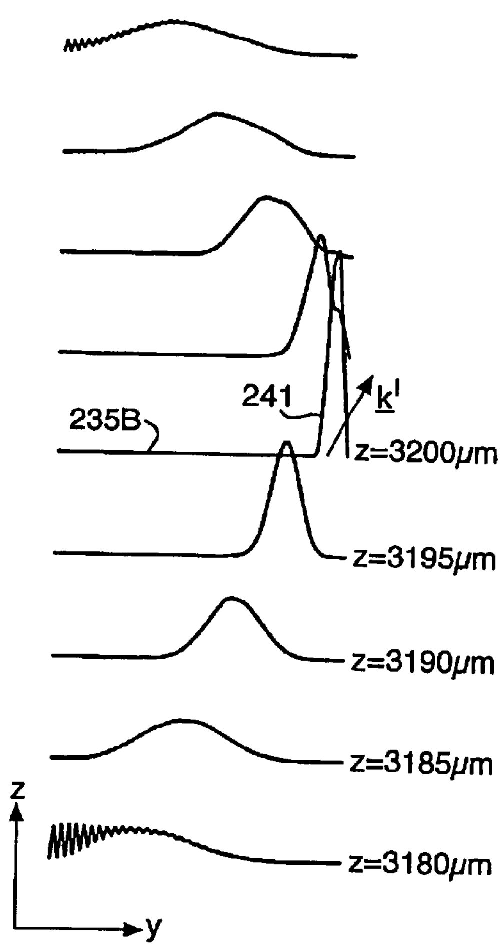

Referring to FIG. 5, the intensity distribution of the spectral component $\lambda_2$=1000 nm in the y-direction within the multimode waveguide 226 is shown at 5 μm intervals in the z-direction, from z=0 to z=40 μm measured from the xy plane 233. The intensity distribution in the y-direction at the xy plane 233 (z=0) is indicated in FIG. 5 by 240. Referring to FIG. 6, the intensity distribution in the y-direction of the spectral component $\lambda_2$=1000 nm is shown at 5 μm intervals in the z-direction from z=3180 μm to z=3200 μm. At a position z=3200 μm, an intensity distribution 241 is produced as a result of modal dispersion and inter-modal interference. The distribution 241 is substantially the same as the distribution 240, although light at the xy plane 235B has a wavevector k' such that $k'_y=-k_y$ and |k'|=|k |. The spectral component $\lambda_2$ =1000 nm is therefore efficiently coupled into output waveguide 2248.

Similarly, spectral component $\lambda_1$=1003 nm is coupled efficiently into output waveguide 224A because the input field distribution for that spectral component is reproduced at a distance $I_1$ from the xy plane 233. Spectral component $\lambda_3$=997 nm is coupled efficiently into output waveguide 224C because the input field distribution for that spectral component is reproduced at a distance $I_3$ from the xy plane 233.

The mux-demux 200 thus efficiently demultiplexes the spectral components $\lambda_1$=1003 nm, $\lambda_2$=1000 nm and $\lambda_3$=997 nm which are combined in the input radiation which is introduced into the input waveguide 222.

The input 122 and output 124 waveguides may be single-mode guides in the yz plane. Alternatively they may multimoded in the yz plane, in which case multiplexed signal light must be introduced into the input waveguide 122 such that only the lowest order transverse mode of that waveguide is excited.

If spectral components in the input radiation for mux-demuxes 100, 200 are more closely spaced in wavelength than 3 nm, centres of the output waveguides 124, 224 must be more closely spaced in the z-direction. However for an output waveguide width $w_1$, centres 125, 225 of the output waveguides have a minimum separation in the z-direction of $w_1/\sin\alpha$=2.94 μm as a result of finite width of the output waveguides: this places a lower limit on the wavelength spacing of the optical channels which can be demultiplexed by the mux-demuxes 100, 200.

The mux-demux 100 utilises the phenomenon of generation of a mirror image about a central longitudinal axis 101 of an input field distribution 140 of a spectral component λ at a distance $L=4w_2^2/\lambda$ within the multimode waveguide 126, whereas the mux-demux 200 utilises replication of an input field distribution 240 of a spectral component λ at a distance $L=8w_2^2/\lambda$ within the multimode waveguide 226. Therefore a change dλ in wavelength of a particular spectral component λ corresponds to a change in z-position of a corresponding output waveguide of $(-4w_2^2/\lambda^2)d\lambda$ in the case of the mux-demux 100 and $(-8w_2^2/\lambda^2)d\lambda$ in the case of the mux-demux 200, i.e. the rate of change of z-position with wavelength of the centre of an output waveguide for the mux-demux 200 is twice that for the mux-demux 100. Hence a mux-demux such as 200 is capable of greater wavelength resolution than a mux-demux such as 100. For example, if the output waveguides 124A, 124B, 124C of the mux-demux 100 are arranged contiguously (i.e. without any intervening spaces) and $L_2=4w_2^2/\lambda_2$=1600 μm ($\lambda_2$=1000 nm) then the mux-demux 100 would operate to demultiplex channels having a wavelength spacing $$\Delta\lambda = \frac{w_1\lambda_2^2}{4w_2^2\sin\alpha} = 1.84 \text{ nm}$$

i.e. to demultiplex channels having wavelengths $\lambda_1$=1001.84 nm, $\lambda_2$=1000 nm, $\lambda_3$=998.16 nm.

If the output waveguides 224A, 224B, 224C of the mux-demux 200 were to be arranged contiguously with $L_2=8w_2^2/\lambda$=3200 μm ($\lambda_2$=1000 nm), the mux-demux 200 would operate to demulitplex channels having a wavelength spacing $$\Delta\lambda = \frac{w_1\lambda_2^2}{8w_2^2\sin\alpha} = 0.92 \text{ nm},$$

i.e. to demultiplex channels having wavelengths, $\lambda_1$=1000.92 nm, $\lambda_2$=1000 nm, $\lambda_3$=998.08 nm.

Alternative mux-demuxes of the invention may be based on generation of a mirror image about a central longitudinal axis of a multimode waveguide of an input field distribution of a spectral components λ in a z-distance $4Nw_2^2/\lambda$ (where N is an odd positive integer) within the multimode waveguide; input and output waveguides of such a device are disposed on opposite lateral sides of a multimode waveguide, as in FIG. 1. Further alternative mux-demuxes of the invention may be based on replication of an input field distribution of a spectral component λ in a z-distance $4Nw_2^2/\lambda$ (where N is an even integer) within a multimode waveguide; input and output waveguides of such a device are disposed on a common lateral side of a multimode waveguide, as in FIG. 2.

Figure 7:
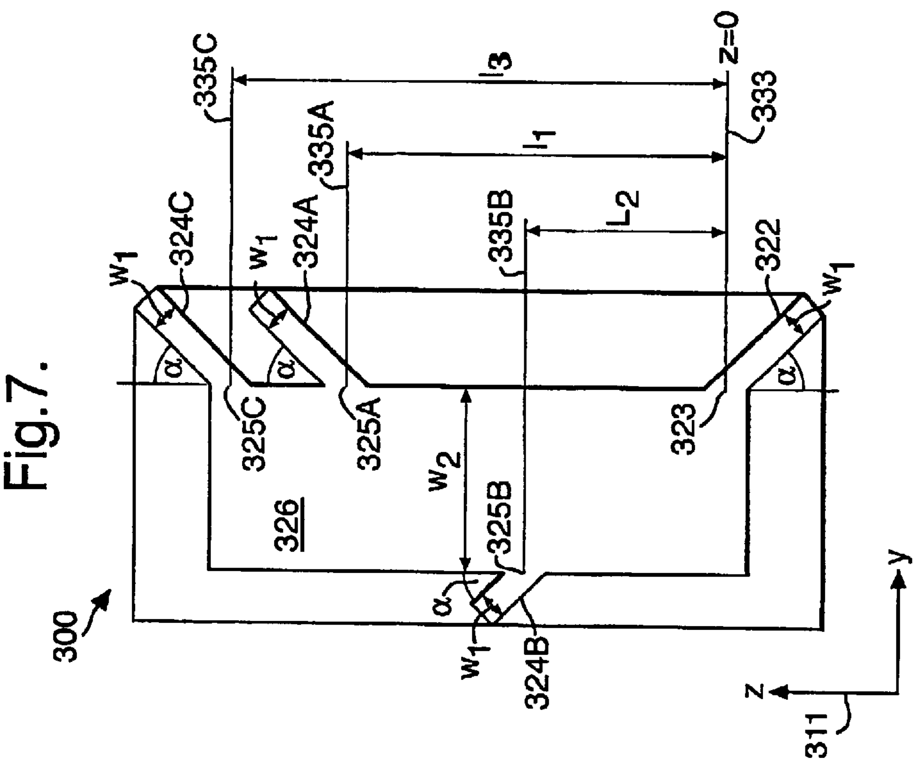
FIG. 7 shows a plan view of a further optical multiplexer and demultiplexer of the invention.

Referring now to FIG. 7, there is shown a further mux-demux of the invention, indicated generally by 300. Parts of the mux-demux 300 equivalent to those of the demultiplexer 200 are like referenced with numerals differing from those in FIG. 4 by a value of 100. The mux-demux 300 is referred to a coordinate system 311 and has a construction like to that of the mux-demux 200, except that one output waveguide, 324B, is disposed on a lateral side of a multimode waveguide 326 opposite to that which communicates with the input waveguide 322 and the other output waveguides 324A, 324C. The mux-demux 300 is arranged to demultiplex channels having wavelengths $\lambda_1$=1003 nm, $\lambda_2$=1000 nm and $\lambda_3$=997 nm which are introduced into the input waveguide 322 as a multiplexed optical signal. Centres 325A, 325B, 325C of output waveguides 324A, 324B, 324C at the multimode waveguide 326 are displaced in the z-direction from the centre 323 of the input waveguide 322 at the multimode waveguide 326 by distances $I_1=8w_2^2/\lambda_3$=3190.4 μm, $L_2=4w_2^2/\lambda_2$=1600 μm and $I_3=8w_2^2/\lambda_3$=3209.6 μm respectively. Individual demultiplexed optical channels $\lambda_1$=1003 nm, $\lambda_2$=1000 nm and $\lambda_3$=997 nm exit the mux-demux 300 via output waveguides 324A, 324B and 324C respectively.

A mux-demux such as 300 provides an alternative to a device such as 200 in circumstances where individual optical channels within the input radiation are so closely spaced in wavelength that the output waveguides of a mux-demux such as 200 are difficult or impossible to fabricate because of their dose spacing. A mux-demux such as 300 provides a further increase in wavelength resolution over a device such as 200. For example, a variant of the device 300 in which $L_2=4w_2^2/\lambda_2$=1600 μm ($\lambda_2$=1000 nm), $I_1$=3198.5319 μm and is $I_3$=3201.4695 μm (i.e. centres 325A, 325C of output waveguides 324A, 324C, are separated by a z-distance of $w_2/\sin\alpha$=2.94 μm so that those output waveguides are contiguous in the z-direction) operates to demultiplex channels having a wavelength spacing of 0.4590 nm, i.e. to demultiplex channels having wavelengths $\lambda_1$=1000.4590 nm, $\lambda_2$=1000.0000 nm and $\lambda_3$=999.5410 nm.

Although the mux-demuxes described above each have three output waveguides, devices of the invention may have two or more waveguides and operate to demultiplex an optical signal comprising two or more individual wavelength channels.

The devices 100, 200, 300 described above may be used in reverse to multiplex optical channels, i.e. to combine optical signals of different wavelength into a single optical signal. Suitable single-wavelength signals may be introduced into the waveguides 124, 224, 324 and multiplexed signals then exit the devices via the waveguides 122, 222, 322.

A mux-demux of the invention may be modified to produce an active (laser oscillator) device which generates output radiation comprising multiplexed wavelength channels. For example, the mux-demux 200 of FIG. 4 may be modified by providing mirrors at the ends of the waveguides 222, 224 and by providing optical gain at appropriate wavelengths within the waveguides 224A, 224B, 224C.

Optical output is then obtained from the waveguide 222 in the form of multiplexed laser radiation consisting of wavelengths of $\lambda_1$=1003 nm, $\lambda_2$=1000 nm and $\lambda_3$=997 nm. If the laser oscillator's optical gain is provided by passing current through each of the waveguides 224, such a device may be also be used to modulate the individual output channels as would be required in an optical communication system. For example, the current applied to a particular waveguide 224 may be switched between two values such that the round-trip gain within the device 200 for the wavelength channel corresponding to that waveguide is switched above and below lasing threshold.

What is claimed is:

1. An optical multiplexer and demultiplexer comprising (i) a multimode waveguide (ii) a first coupling waveguide which communicates with the multimode waveguide at a first longitudinal position therealong; and (iii) two second coupling waveguides which communicate with the multimode waveguide at respective second longitudinal positions therealong;

wherein the second longitudinal positions and the relative orientations of the waveguides' central longitudinal axes are such that an input optical field distribution, being a lowest order transverse mode of the coupling waveguides and comprising radiation of first and second wavelengths, when introduced into the multimode waveguide via the first coupling waveguide is substantially reproduced at the second longitudinal positions as first and second output optical field distributions of first and second wavelengths respectively, which output distributions are coupled into respective second coupling waveguides, by virtue of modal dispersion and inter-modal interference within the multimode waveguide, characterised in that the coupling waveguides each communicate with a lateral side of the multimode waveguide.

2. A multiplexer and demultiplexer according to claim 1 wherein the second longitudinal positions are located on a lateral side of the multimode waveguide opposite to that on which the first longitudinal position is located.

3. A multiplexer and demultiplexer according to claim 2 characterised in that each second longitudinal position is separated from the first longitudinal position by a distance $4mw^2/\lambda$ where m is a positive integer, w is the coupling waveguides' width and $\lambda$ is a wavelength to be multiplexed or demultiplexed.

4. A multiplexer and demultiplexer according to claim 1 characterised wherein the second longitudinal positions and the first longitudinal position are located on a common lateral side of the multimode waveguide.

5. A multiplexer and demultiplexer according to claim 4 characterised in that each second longitudinal position is separated from the first longitudinal position by a distance $8mw^2/\lambda$ where m is a positive integer, w is the coupling waveguides' width and $\lambda$ is a wavelength to be multiplexed or demultiplexed.

6. A multiplexer and demultiplexer according to claim 1 wherein second longitudinal positions are located on both lateral sides of the multimode waveguide.

7. A laser oscillator characterised by a multiplexer and demultiplexer according to claim 1.

* * * * *